(12) United States Patent
Buldhaupt et al.

(10) Patent No.: US 6,508,394 B1
(45) Date of Patent: Jan. 21, 2003

(54) METHOD FOR MAKING MULTISHEET METAL SANDWICH STRUCTURE WITH THROUGHHOLES

(75) Inventors: Frederick W. Buldhaupt, Buckley, WA (US); David H. Gane, Seattle, WA (US); Matthew G. Kistner, Irvine, CA (US); Jeffrey D. Will, Renton, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/386,737

(22) Filed: Aug. 31, 1999

Related U.S. Application Data (62) Division of application No. 09/101,688, filed as application No. PCT/US96/20106 on Dec. 20, 1996, now Pat. No. 5,994,666.
(60) Provisional application No. 60/010,033, filed on Jan. 12, 1996.

(51) Int. Cl.$^7$ .............................................. B23K 31/02
(52) U.S. Cl. ..................................................... 228/157
(58) Field of Search ....................... 219/121.64, 121.69, 219/121.71, 121.72; 228/157

(56) References Cited

U.S. PATENT DOCUMENTS

| | | |
|---|---|---|
| 3,547,751 A | 12/1970 | Morgan |
| 3,924,793 A | 12/1975 | Summers et al. |
| 3,927,817 A | 12/1975 | Hamilton et al. |
| 4,077,109 A * | 3/1978 | Larson ........................ 419/49 |
| 4,217,397 A | 8/1980 | Hayase et al. |
| 4,304,821 A | 12/1981 | Hayase et al. |
| 4,361,262 A | 11/1982 | Israeli |
| 4,588,651 A | 5/1986 | Israeli |
| 4,603,089 A | 7/1986 | Bampton |
| 4,820,355 A * | 4/1989 | Bampton ..................... 148/535 |
| 5,024,369 A | 6/1991 | Froes et al. |
| 5,045,668 A | 9/1991 | Neiheisel et al. |
| 5,102,033 A | 4/1992 | Woods et al. |
| 5,141,146 A | 8/1992 | Yasui |

(List continued on next page.)

FOREIGN PATENT DOCUMENTS

EP      0 535 935 A1      7/1993

OTHER PUBLICATIONS

"Advances in Aircraft Component Superplastic forming/Diffusion Bonding Technology," SAE Technical Paper Series 912216, dated Sep. 23, 1991.

*Primary Examiner*—Samuel M. Heinrich
(74) *Attorney, Agent, or Firm*—John C. Hammar (57) ABSTRACT

A method of making an expanded metal sandwich structure includes cleaning at least two metal superplastic core sheets to remove metal oxides and residues that would interfere with diffusion bonding of the sheets. The core sheets are placed face-to-face and a gas pressure line fitting is inserted between one edge and is welded into place. The fitting has a through bore through which gas can from under pressure from a gas pressure control system into the space between the core sheets. The core sheets are pressed together and laser welded together into a core pack along lines which will form junction lines between the core sheets when the core pack is superplastically expanded. The core pack is chemically cleaned to remove metal oxides and residues that would interfere with diffusion bonding of the core pack sheets to face sheets. Two metal face sheets having superplastic characteristics are chemically cleaned and placed over and under the core pack. An envelope gas fitting is placed between the face sheets and is welded in place while seal welding around the entire peripheral edges of the face sheet and the core pack to produce a sealed envelope pack enveloping the core pack, with gas fittings into the core pack and into a face sheet zone between the face sheets and the core pack.

1 Claim, 12 Drawing Sheets

U.S. PATENT DOCUMENTS

| | | |
|---|---|---|
| 5,205,467 A | 4/1993 | Sarkisian et al. |
| 5,286,946 A | 2/1994 | Will |
| 5,289,965 A | 3/1994 | Yasui et al. |
| 5,309,747 A | 5/1994 | Yasui |
| 5,366,787 A | 11/1994 | Yasui et al. |
| 5,419,170 A | 5/1995 | Sanders et al. |
| 5,451,472 A | 9/1995 | Gregg et al. |
| 5,534,354 A | 7/1996 | Gregg et al. |
| 5,611,944 A | 3/1997 | Gilkinson et al. |
| 5,687,900 A | 11/1997 | Zaccone et al. |
| 5,723,225 A | 3/1998 | Yasui et al. |

\* cited by examiner

METHOD FOR MAKING MULTISHEET METAL SANDWICH STRUCTURE WITH THROUGHHOLES

REFERENCE TO RELATED APPLICATIONS

The present application is a divisional application based upon U.S. patent application Ser. No. 09/101,688 filed Jul. 10, 1998 now U.S. Pat. No. 5,994,666 which claims priority from 371 International Application PCT/US96/20106, filed Dec. 20, 1996, which claims priority from U.S. Provisional Patent Application No. 60/010,033, filed Jan. 12, 1996.

This invention pertains to fabrication of expanded multisheet metallic structures, and more particularly to apparatus and methods for superplastic forming of a pack made up of multiple sheets of superplastic metal, welded together using laser welding and expanded in a preheated die using a precisely controlled gas forming schedule.

BACKGROUND OF THE INVENTION

Multisheet superplastically formed, diffusion bonded, expanded metal sandwich structures have been in use for many years, primarily in the aerospace industry, because of the low cost, high temperature capability and good strength and stiffness per unit weight that these structures offer. Various processes for fabricating these structures have been developed in the past, with various degrees of success, but all have proven costly and slow to produce, and often they have been prone to produce defective or unreliable parts.

Most of the existing techniques for fabricating such structures, including the truss core technique shown in U.S. Pat. No. 3,927,817 to Hamilton, utilize superplastic forming of a stack of sheets in a die having a cavity shaped like the final sandwich structure. The stack includes one or more core sheets that are selectively joined to each other, when there is more than one core sheet, and to a top and bottom sheet that form the top and bottom outside skins of the sandwich structure. The stack is inflated at superplastic temperature with gas pressure to expand the top and bottom sheets outwardly against the interior walls of the die cavity with gas pressure in a die cavity to the desired exterior dimensions. During superplastic forming, the core sheets stretch between their attachment areas to the top and bottom skins as those skins expand toward the boundary surfaces of the die cavity.

Early developments of techniques for fabricating multisheet expanded metal sandwich structures utilized diffusion bonding to join the core sheets along selective areas to produce the desired core structure. These techniques require the accurate placement of stop-off to prevent diffusion bonding in areas where adjacent sheets were not intended to bond together. Diffusion bonding is a desirable joining method because the junction retains superplastic qualities, but it has been difficult to produce a clean junction line free of stop-off that is narrow enough, and diffusion bonding can be a lengthy process with long holding times in the press at elevated temperatures, preventing the press from being used for other production. The capital intensive and time consuming nature of the diffusion bonding process lead to research into other techniques for joining the core sheets of multisheet stack that would be faster, more reliable, and less costly.

Another joining method, shown in U.S. Pat. Nos. 4,217,397 and 4,304,821 to Hayase et al., uses resistance welding of the core sheets along the selected lines to establish the junction lines between the core sheets, leaving gaps in the weld lines for passage of forming gas into the cells. This process was faster than the diffusion bonding technique, but still required that the core and face sheets not be loaded into a hot die to avoid premature diffusion bonding of the core sheets to each other. After closing the die, the stack could be purged and pressurized to slightly inflate the stack and separated the sheets from one another so that they would not diffusion bond together where no bonding was desired. The die would then be heated to superplastic temperature and forming gas would be admitted under pressure into the stack co superplastically expand the top and bottom sheets against the walls of the die cavity and stretch the core sheets between the top and bottom sheets to form the desired sandwich structure.

To prevent premature diffusion bonding of the face sheets in the stack with the core sheets, a device is used in the apparatus of the Hayase et al. patents to hold the face sheets spaced apart from the core sheets. Eight separate tooling pieces are shown for this purpose, which increases the cost and complexity of the forming process. For a high rate production operation, it would be preferable to simplify the tooling and enable the parts to be loaded into the die while it is hot, to achieve an increased production rate and lower production cost.

For successful forming to occur, a pressure differential must be established between the face sheet zones and the core sheet zones, and this pressure differential must be equalized over both face sheet zones. Otherwise, the core sheets will form unevenly and will result in excessive thinning.

Heating titanium to a high temperature in the presence of oxygen creates a surface layer of alpha case which is a hard but very brittle composition and is unacceptable in structural parts because of its tendency to crack. Such cracks could grow in a fatigue environment and lead to failure of the part. Consequently, it is desirable to purge oxygen and moisture from the stack of sheets of before heating to elevated temperatures. An ideal process would be one in which the stack of sheets is sealed and purged of oxygen and moisture before loading so the sealed pack could be loaded into a hot die without the danger of alpha case forming before the stack is purged and without using expensive press time to purge the stack and then slowly bring the die up to superplastic temperature.

Another fastening technique, shown in U.S. Pat. No. 4,603,089 to Bampton, uses a $CO_2$ laser to weld sheets in the stack together. However, the Bampton disclosure does not teach any way to hold the sheets together while they are being laser welded, and indeed does not disclose any apparatus at all to perform the welding operation. In fact, in a production operation for making a laser-welded multisheet expanded metal sandwich structure, such as that shown in U.S. Pat. No. 5,330,092 to Gregg et al., it is necessary to press the sheets into intimate contact to obtain a quality weld, and to do so with a high speed, efficient, high production rate apparatus in order to benefit from the potential benefits that laser welding has to offer. In addition to exerting a press-up force on the sheets during welding, such an apparatus ideally would protect the weld area from oxidation at high temperature that occurs during laser welding of titanium.

Weld cratering and tight radii at the start and stop of the weld are inherent limitations of laser welding. They are the consequences of the high intensity, narrowly focused nature of the beam, and have in the past resulted in sharp termination points that concentrated stresses at those points which can rip the core sheet when the core is pressurized by forming gas during superplastic forming. The laser naturally produces a "keyhole" weldment that forms a crater at the weld termination, severely undercutting the top sheet at the end point of a stitch weld. Such welds weaken the top sheet of the core stack at the weld termination at a point that experiences high stress during inflation by gas pressure during superplastic forming. A production process that optimally utilizes the potential benefits of laser welding would eliminate these weak points at the beginning and terminating ends of the weld.

SUMMARY OF THE INVENTION

Accordingly, it is an object of this invention to provide an improved process for forming multisheet expanded metal sandwich structures. Another object of the invention is to provide an improved process for making a multisheet expanded metal sandwich structure, and the structure made thereby, having face sheets and diffusion bonded internal webs extending therebetween wherein the webs have reduced thinning and hence superior strength over similar structures made by prior art processes. Yet another object of this invention is to provide an improved method of cleaning sheets to be diffusion bonded to improve the percentage of well bonded parts produced in production. Still another object of this invention is to provide a traveling laser welding head having a pressure foot for pressing up the sheets in a stack to be laser welded. A further object of this invention is to provide an improved process for laser welding a stack of sheets wherein the sheets in the stack are pressed into intimate contact around the region of the weld to ensure good weld quality. A still further object of this invention is to provide a process of laser welding superplastic sheets for later superplastic forming wherein stop-off is applied to the sheet interface to prevent later diffusion bonding, and the sheets are laser-welded through the stop-off. Another still further object of this invention is to provide a process of forming a multisheet expanded metal sandwich structure by superplastic forming/diffusion bonding wherein the pack of sheets to be formed into the sandwich structure are loaded and unloaded into a superplastic forming die at high temperature. Still another further object of this invention is to provide an improved process and structure for securely attaching a gas supply line to a pack for superplastic forming/diffusion bonding thereof into a multisheet expanded metal sandwich structure. Another yet still further object of this invention is to provide an improved method of laser welding metal sheets together avoiding cratering, undercutting and pointed laser weld end points that can cause concentration of stress in the welded structure and tearing of the sheets when the pack is inflated during superplastic forming. Still another yet further object of this invention is to provide a method of making a multisheet expanded metal sandwich structure having sealed openings through the sandwich structure for access through the structure for fasteners, fluid or electric lines, control cables or the like.

These and other objects are attained in a process for making an expanded metal sandwich structure, including cleaning at least two metal sheets having superplastic characteristics for forming a core of the sandwich structure, to remove metal oxides and residues that would interfere with diffusion bonding of the sheets. At least one surface of at least one of the core sheets is coated with a stop-off compound such as boron nitride to prevent that surface from diffusion bonding to other sheets.

The core sheets are placed in a vertical stack, with the stop-off coated surface of the one sheet facing the other sheet. A traveling weld head presses the core sheets together and laser-welds the core sheets through the stop-off along lines which will be along one or more planes located within the metal sandwich structure intermediate the thickness-thereof. The laser-welded core sheets form a core pack. A gas pressure line fitting is inserted between the core sheets along at least one edge. The fitting has a through bore that communicates between the exterior of the core sheets and an interior region therebetween. The core pack is seal welded around its peripheral edge and the gas pressure line fitting is welded to the core sheets. The gas pressure line fitting is plugged and the core pack is chemically cleaned to remove metal oxides and residues that would interfere with diffusion bonding of the sheets.

Two additional superplastic metal face sheets are chemically cleaned to remove oily contamination, metal oxides and residues that would interfere with diffusion bonding of the sheets to the core pack. These sheets are placed one each on the top and bottom faces of the core pack. An envelope gas fitting is positioned in a notch in the core pack between the face sheets and the peripheral edges of the face sheets and the core pack are seal welded. The gas fittings are also seal welded between the face sheets to produce a sealed envelope pack enveloping the core pack, producing a full pack, with gas fittings into the core pack and into a face sheet zone between the face sheets and the core pack.

A gas supply tube is connected from a gas supply control system to each of the fittings, and air and moisture are purged from the packs. The packs are pressurized with an inert forming gas such as Argon, the core pack being pressurized to a higher pressure than the full pack. A die is selected having an internal cavity with the same shape as the desired shape of the metal sandwich structure after it is expanded. Die, preheated to about the superplastic temperature of the metal, is opened to receive the full pack. In the die cavity, the temperature of the full pack raises to the superplastic temperature of the metal, and forming gas is injected through the fittings to inflate the envelope pack to the interior walls of the cavity, and to inflate the core pack to the envelope pack. The full pack also inflates around the inserts to produce a sealed hole through the sandwich structure. After forming is completed, the forming gas pressure is reduced to near ambient, and the forming gas pressure in the core pack is reduced to near ambient, just enough to ensure that the cooling of the part does not pull a vacuum that would tend to produce hollows in the part between the webs. The die is opened and the formed pack is removed from the die while still at an elevated temperature above 1600° F. The formed pack is allowed to cool below 900° F. while remaining connected to the gas supply system, and the gas supply lines are then removed from the gas fittings. Portions of the peripheral flange holding the gas fittings are trimmed off of the formed pack.

If sealed openings through the sandwich structure are needed for fasteners, fluid or electric lines, control cables or the like, a circular laser weld may be made in the full pack before it is superplastically expanded to seal weld around the region where a hole will be cut. The hole can then be cut inside the circular seal weld to produce a sealed opening through the full pack. Insert tubes having a length equal to the height of the die cavity are placed in the sealed holes in the full pack, and the pack forms around the inserts as it inflates, producing sealed openings of the desired opening diameter in the sandwich structure.

DESCRIPTION OF THE DRAWINGS

The invention and its many attendant objects and advantages will become more clear upon reading the following description of the preferred embodiment in conjunction with the following drawings, wherein.

DESCRIPTION OF THE PREFERRED EMBODIMENT

Figure 1:
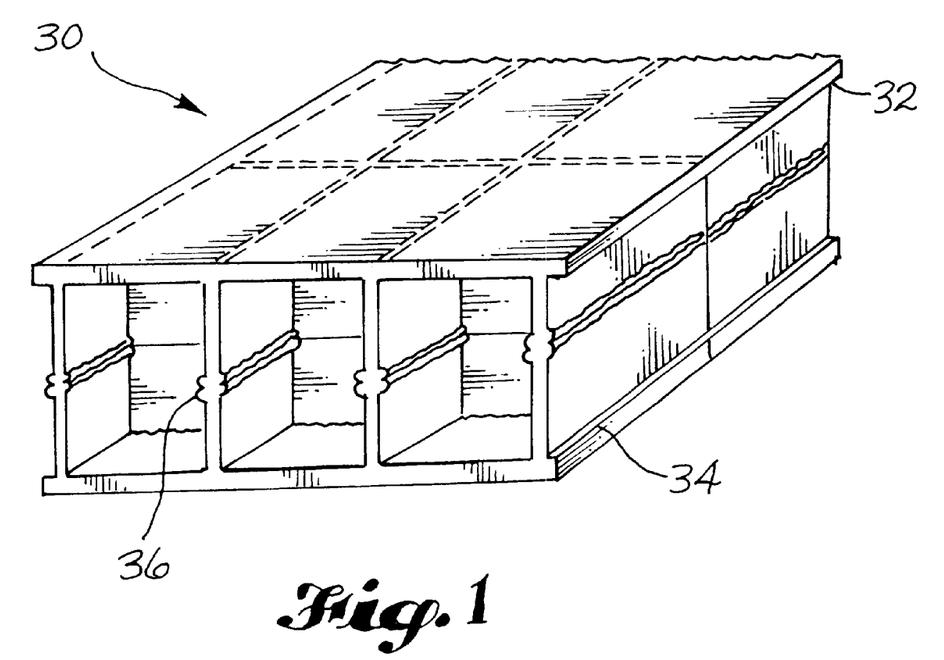
FIG. 1 is a perspective view of a four-sheet expanded metal sandwich structure made in accordance with this invention.

Turning now to the drawings, wherein like reference numerals designate identical or corresponding parts, and more particularly to FIG. 1 thereof, a four-sheet expanded metal sandwich structure 30 made in accordance with this invention is shown having a top skin 32, a bottom skin 34, and a plurality of webs 36 extending between and integrally connected to the top and bottom skins. The webs 36 are preferably arranged as indicated to form a plurality of square cells 38, although cells of other shapes can be made, such as hexagonal cells made with webs made in a hexagonal pattern.

The sandwich structure shown in FIG. 1 is made from four sheets of a metal, such as titanium 6-4 alloy, which has super-plastic and diffusion bonding characteristics. Superplastic characteristics include the capability of the metal to develop unusually high tensile elongations and plastic deformation at elevated temperatures, with a reduced tendency toward necking or thinning. Diffusion bonding refers to metallurgical joining of two pieces of metal by molecular or atomic co-mingling at the faying surface of the two pieces when they are heated and pressed into intimate contact for a sufficient time. It is a solid state process resulting in the formation of a single piece of metal from two or more separate pieces, and is characterized by the absence of any significant change of metallurgical properties of the metal, such as occurs with other types of joining such as brazing or welding. The characteristics of superplastic forming and diffusion bonding are now reasonably well understood, and are discussed in detail in U.S. Pat. No. 3,927,817 to Hamilton and U.S. Pat. No. 4,361,262 to Israeli.

Figure 4:
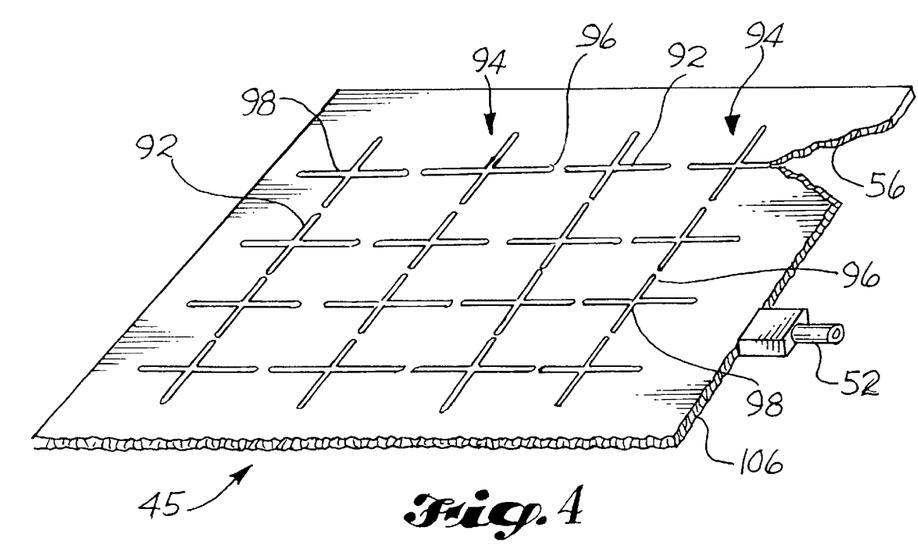
FIG. 4 is a perspective view of a seal-welded core pack for use in making the sandwich structure shown in FIG. 1.
Figure 5:
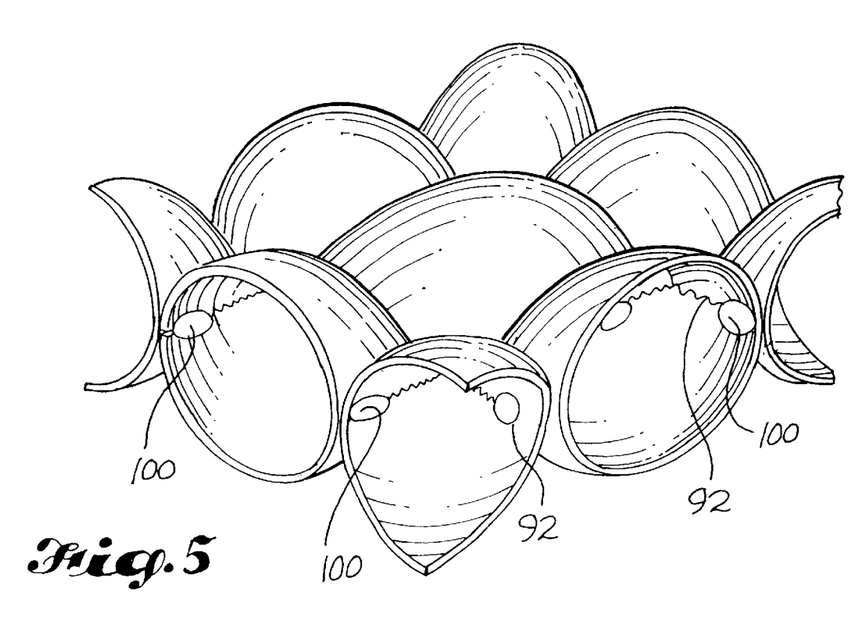
FIG. 5 is a perspective view of the core pack shown in FIG. 4, partially inflated.

Turning now to FIG. 4, a stack 42 of four sheets that make up the sandwich structure shown in FIG. 1 are shown in exploded form to shown their relative positions and the relative positions of the features on and between the sheets. The stack 42 includes two core sheets 44 and 46 and top and bottom face sheets 48 and 50. A core gas fitting 52 is inserted between the two core sheets 44 and 46 that are later welded together to make up a core pack 45. The core gas fitting provides a connection to a forming gas supply system for inflation of the core pack 45 during superplastic forming, wherein the core pack 45 is superplastically inflated as illustrated in FIG. 5 and described in more detail below. An envelope gas fitting 54 is inserted into a notch 56 in the core pack 45 communicating with the interior of an envelope pack 47 made up by the welding around the periphery of the face sheets 46 and 48. The envelope gas fitting 54 provides a gas flow path into the space above and below the core pack 45 and between the face sheets 48 and 50 for superplastic forming, as described below. The gas fittings 52 and 54 are welded into the stack 42 later in the process.

The sheets 44–50 are cut to the desired size, which is the size and shape of the plan form of the sandwich structure part, plus about 2"–6" for a flange 58 around the part by which the part may be clamped in the superplastic die, and by which it may be attached into the assembly for which it is intended. After cutting, the sheets are wiped with acetone to remove ink markings printed on the sheets by the manufacturer. The sheets are then chemically cleaned by immersion, first in an alkaline bath to remove grease and other such contaminants, and then in an acid bath, such as 42% nitric acid and 2.4% hydrofluoric acid to remove metal oxides from the titanium alloy sheets. The cleaned sheets are rinsed in clean water to remove residues of the acid cleaner, but residues from the rinsing solution remain on the sheets after removal from the rinsing bath. These residues are removed from the sheets by wiping with a fabric wad, such as gauze cloth, wetted with a reagent grade solvent such as punctilious ethyl alcohol. The sheets are wiped until the gauze comes away clean after wiping. The alcohol evaporates leaving no residue and leaving the sheets free of contaminants that would interfere with a complete and rapid diffusion bond when the conditions for such a bond are established.

One side of one of at least one of the core sheets 44 and 46 is coated with a stop-off compound such as boron nitride. For large area surfaces, the boron nitride may be dissolved in a solvent such as a mixture of water and alcohol and sprayed with an electrostatic sprayer onto the entire surface area of the one side of the one sheet. The water and alcohol evaporate, leaving a thin even coating of boron nitride on the surface of the titanium sheet. For smaller surfaces, the stop-of may be sprayed from an aerosol can of a solution of boron nitride in an alcohol solution that is commercially available from the Cerac Company in Milwaukee, Wis.

Figure 6A:
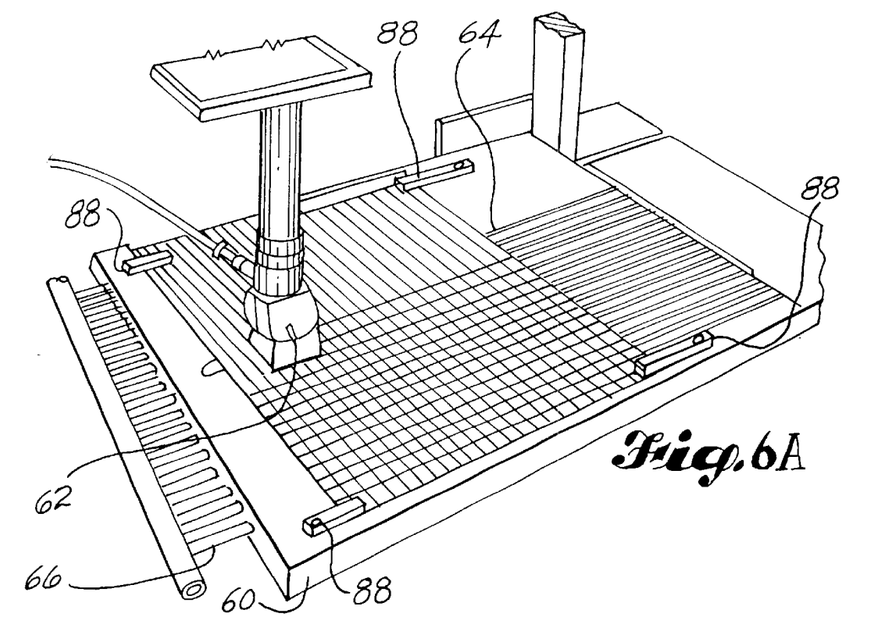
FIG. 6A is a perspective view of a motion control table and laser welding apparatus for welding the core pack for the sandwich structure shown in FIG. 1.
Figure 6B:
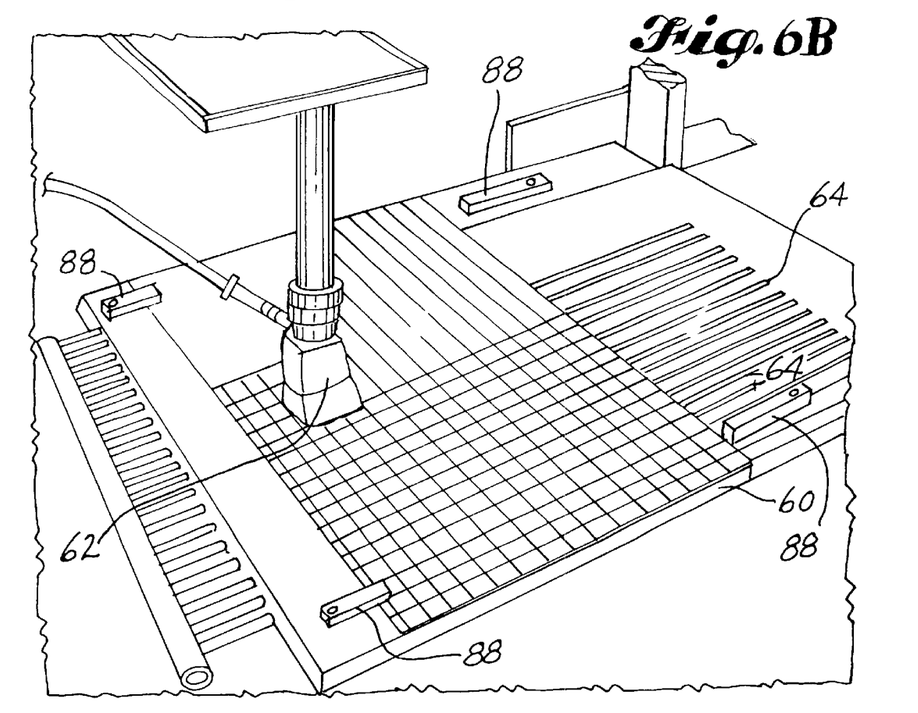
FIG. 6B is a perspective view of a motion control table and laser welding apparatus shown in FIG. 4A, but with a cover sheet over the grooves in the table to prevent loss of argon.
Figure 7:
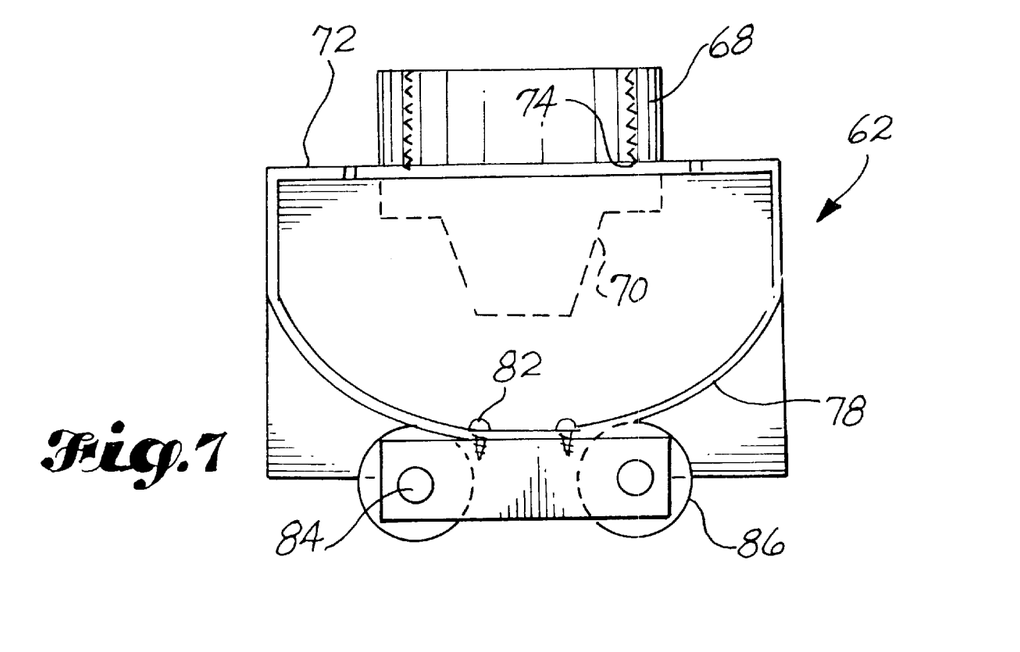
FIGS. 7 and 8 are elevation and plan views, respectively, of a pressure trolley used to press the sheets together during welding and blanket them with inert gas.
Figure 8:
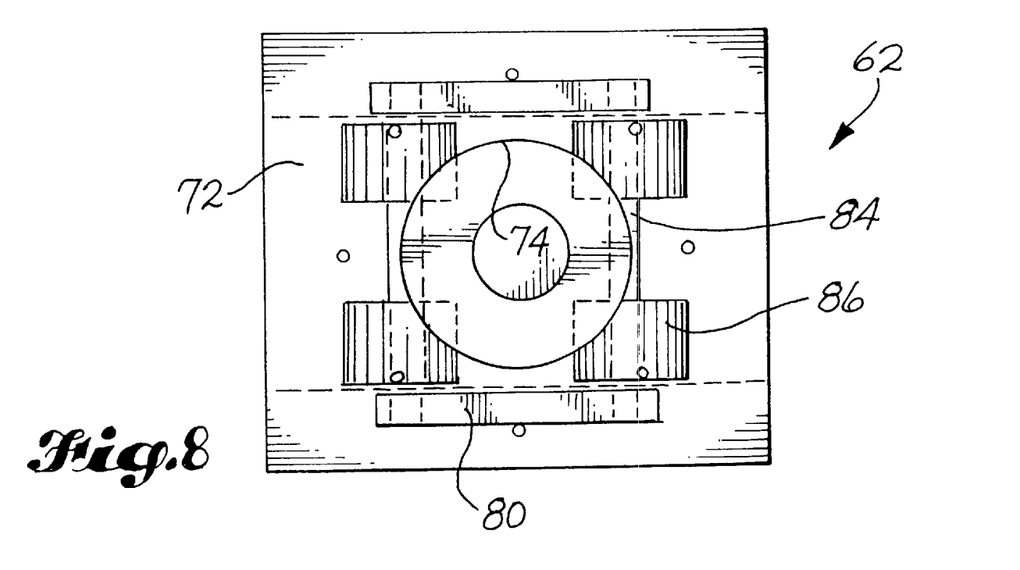

The coated sheet is aligned with and abutted against the other sheet, with the boron nitride coated face facing the other sheet. The two core sheets 44 and 46 are laser welded in the pattern shown in FIG. 4 on a laser welding apparatus shown in FIGS. 6A and 6B, purchased from Convergent Energy Corp. in Sturbridge, Mass. The apparatus 59 includes a CNC motion control table 60 on which the sheets 44 and 46 are placed and secured in an aligned stack. A vertically movable plunger is mounted over the table 60. The plunger has a fitting on which a pressure trolley 62, shown in more detail in FIGS. 7 and 8, is mounted for exerting a vertical force on the sheets to press them into intimate contact during laser welding by a laser beam aimed vertically downward through the center of the trolley 62 at the table.

The motion control table 60 has a series of parallel grooves 64 opening upwardly in its upper surface, and a perforated tube 66 in each groove. The tubes 66 are connected to a manifold that is connected through a pressure control valve (not shown) to a supply of Argon gas. Argon is admitted through the tubes to flood the area between the table 60 and the bottom core sheet 46 and displace oxygen and nitrogen from the area. As shown in FIG. 6B, the area of the table 60 not covered by the sheets 44 and 46 may be covered by another sheet which is held down on the table 60 by weights or magnets to save argon. The motion control table 60 is connected to actuators, such as ball screws or the like, to move the table 60 on slides in the X-Y directions on a horizontal plane under the pressure trolley 62.

The laser apparatus (not shown) has an optical system for directing and focusing the laser beam from the a laser generator vertically through a threaded connector 68 on the trolley 62. The connector 68 can be loosened to turn the trolley 62 to point in a desired direction and then tightened with a jam nut to remained aimed in that direction. A gas flood nozzle 70, best shown in FIG. 7, is mounted at the lower end of the connector 68 for directing a wide, low pressure stream of helium onto the top core sheet 44 at the weld point where the laser beam impinges the top sheet 44. The helium gas displaces oxygen and nitrogen from the weld point and prevents formation of titanium oxides and nitrides over the laser weldment. Helium is used instead of argon because it enhances the plasma, whereas argon gas tends to suppress the plasma. The gas flooding technique is used to avoid disturbing the puddle of molten titanium alloy, instead of a high pressure narrow gas jet which is used in laser cutting to displace the molten metal out of the kerf to leave a narrow cut through the metal.

The laser welding pressure trolley 62 has a top plate 72 with a center hole 74 around which the threaded connection 68 is welded. Four sheet metal sides 76 depend from the top plate 72 to provide an enclosure for a cloud of helium to blanket the weld point and surrounding area. A pair of spring loops 78 is fastened one each on each side of the trolley 62, and supports a pair of bars 80 attached, as by screws 82 to the spring loops 78. Two spaced axles 84 are journaled in holes in holes in the bars 80, spanning the bars and supporting cylindrical wheels 86.

For curved laser welds such as circular welds used to make "egg crate" three sheet expanded metal sandwich structures or sinusoidal welds used to make four sheet sinusoidal web sandwich structures, an omni-directional capability for rolling the trolley on the core pack would be desirable. The cylindrical wheels 86 roll best in the plane normal to their axis of rotation. Omni-directional rolling capability is provided by spherical ball rollers, each mounted in the end of a piston spring or air pressure biased in a cylinder opening in the underside of the trolley 62. The ball rollers should be fairly large, preferably about an inch in diameter, ard should be at least six in number spaced uniformly in a circle around the gas flood nozzle 70.

In use, a pair of core sheets 44 and 46 are laid on the table 60 and secured thereon by clamps 88. The argon gas is turned on to flood the underside of the bottom core sheet 46 through the tubes 66 with inert gas and displace the oxygen and nitrogen from the region between the table 60 and the underside of the sheet 46. The flow rate will depend on the table size, but for a table 36" square, a flow rate of about 20 cubic feet per hour is sufficient. The controller for the table actuators is programmed with the speed and dwell of the table movement and the spacing between adjacent welds. The trolley 60 is aligned with the plane of its wheels 86 parallel with the grooves 64 in the table 60, and the vertical motion mechanism on which the trolley 62 is mounted is lowered to engage the wheels 86 with the top surface of the top sheet 44. The vertical extension of the vertical motion mechanism is selected to deflect the spring loops 78 to the extent necessary to produce the desired compressive force exerted by the wheels 86 on the top sheet 44. For example, a 38 pound force can be exerted by two titanium spring loops ½" wide and 3½" long when deflected about ¾". This would be sufficient force to press two titanium alloy sheets 0.025" thick into such intimate contact that an excellent laser weld, substantially free of porosity, is obtained.

Figure 9A:
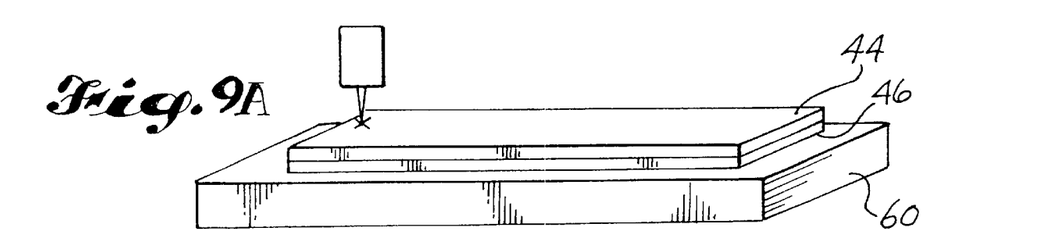
FIGS. 9A–9G are schematic diagrams showing the laser stitch weld process in accordance with this invention.
Figure 9B:
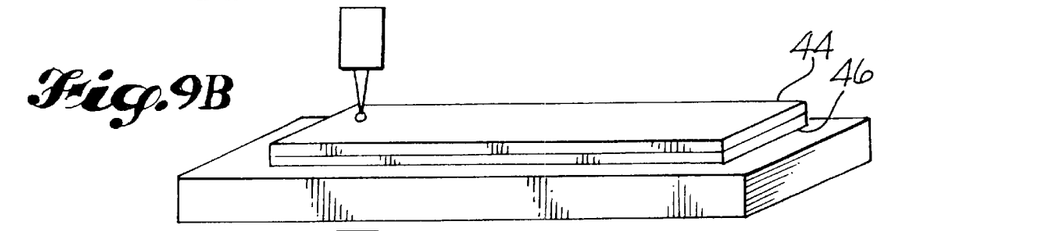

The helium gas is turned on at a flow rate of about 40 cubic feet per hour and after purging the air from the sheet metal enclosure 76, the laser is turned on with a power of about 650 watts, continuous wave. At the start of the weld, the laser is allowed to dwell for about 0.25 seconds at the beginning point in the weld, as shown in FIG. 9A and FIG. 9B. The dwell time melts a small puddle of titanium and forms a bulbous node 90 at the start of the weld instead of the usual sharp point at the start of a laser weld which can concentrate forces at a small point and initiate a tear in the metal which could then propagate through the weldment or elsewhere in the material.

Figure 9C:
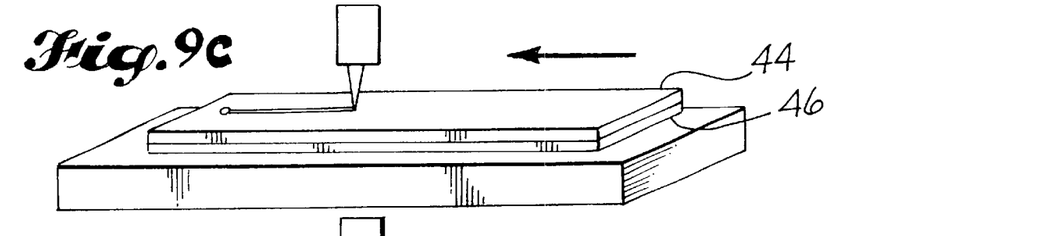
Figure 9D:
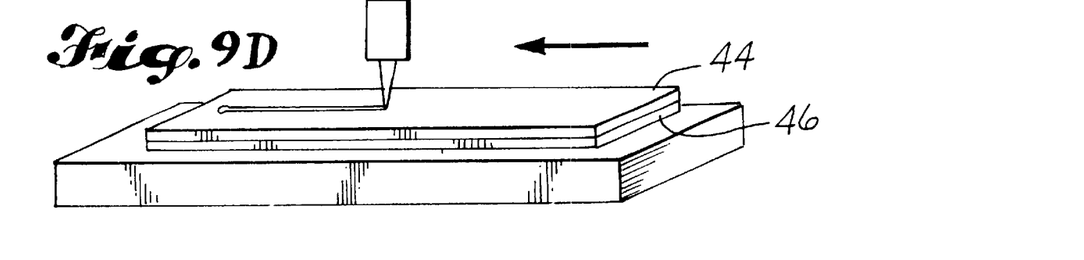
Figure 9E:
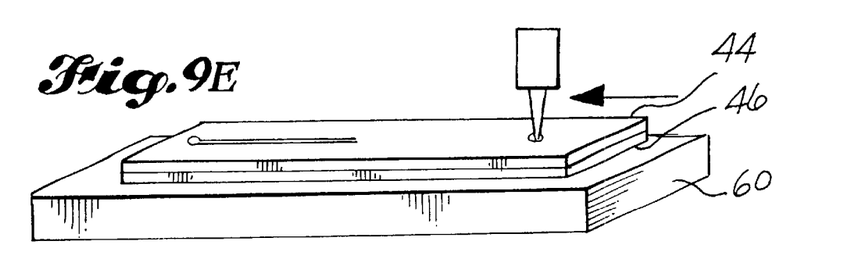
Figure 9F:
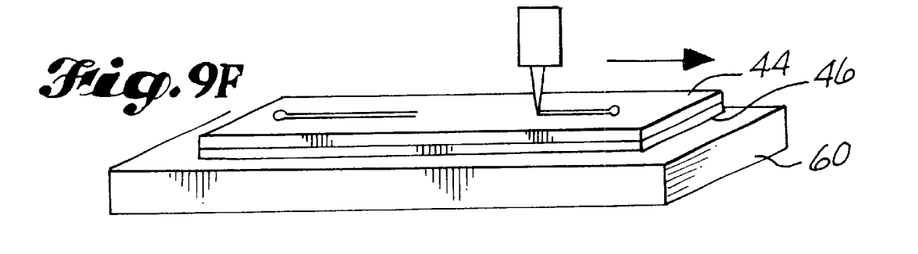
Figure 9G:
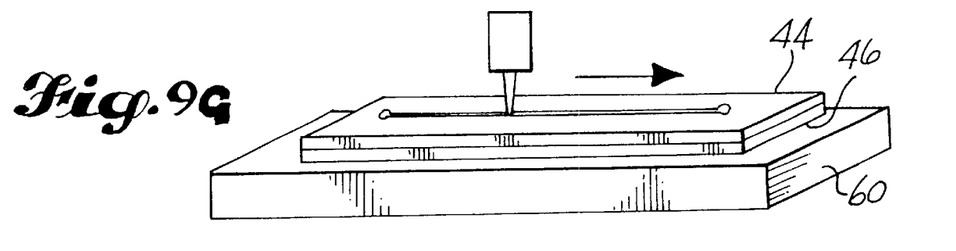
Figure 10:
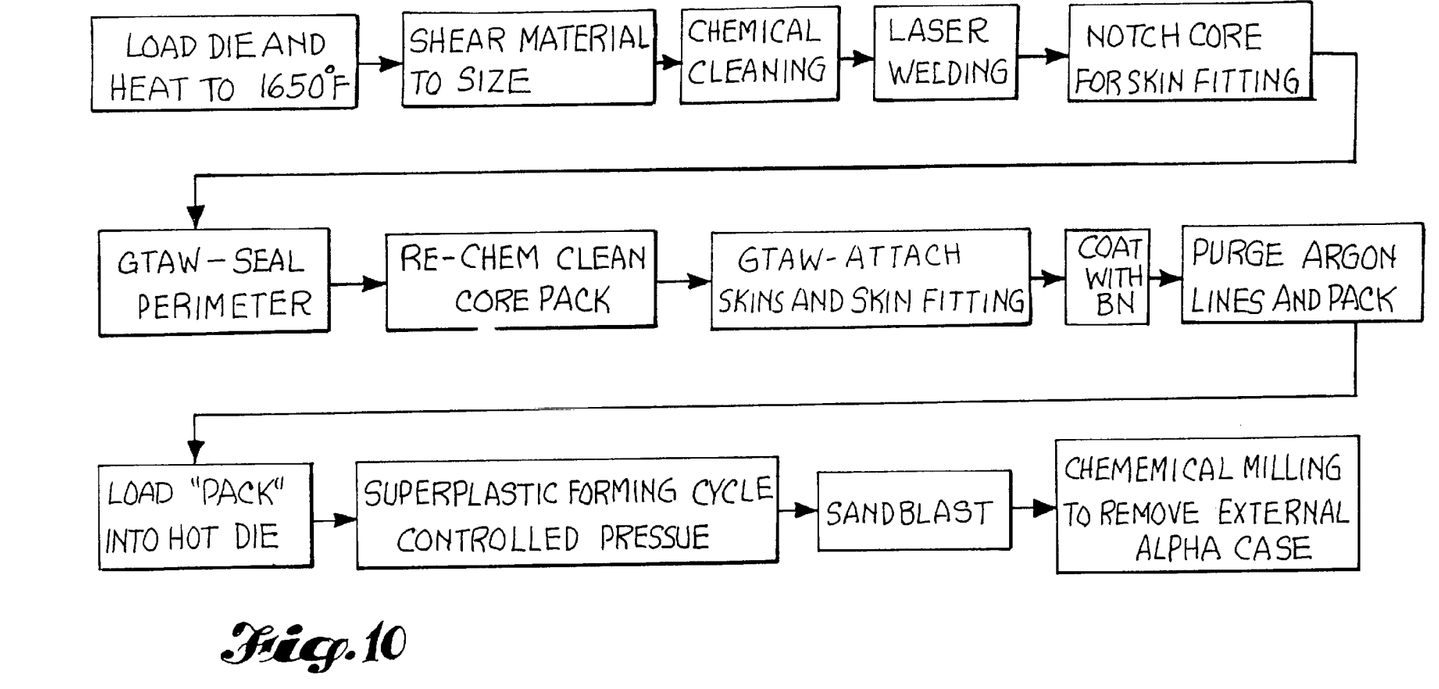
FIG. 10 is a process flow diagram showing the process of this invention.

After the dwell period, the table 60 is moved as indicated in FIG. 9C to cause the weld point to travel along the sheets 44 and 46 to produce a weld line 92. The speed of travel is selected on the basis of the laserpower and thickness of the sheets. For two sheets of titanium 6-4 alloy 0.025" thick and a laser power of 650 watts, a table speed of 60 inches/min. produces a complete weld of excellent quality. As the weldpoint passes the midpoint of the weld line 92, the laser power is ramped down gradually until it eventually decouples from the sheets 44/46, as indicated in FIG. 9D. The table 60 is now moved to position the laser point at the other end of the weld line and the laser is turned on again and allowed to dwell as before to create another bulbous node 90 at the other end of the weld line, as indicated in FIGS. 9E. after the dwell, the table is moved to move the laser weld point toward the first end of the weld, as indicated in FIG. 9F, and as the laser reaches the weld line midpoint, the laser power is ramped down gradually so that the laser welds back over the portion previously welded, as shown in FIG. 9G and then decreases in power until the laser eventually decouples from the sheets 44/46. The gradual ramp-down in power prevents the formation of an undercut terminal portion in a laser weld which otherwise occurs when the laser power is terminated abruptly.

Figure 2:
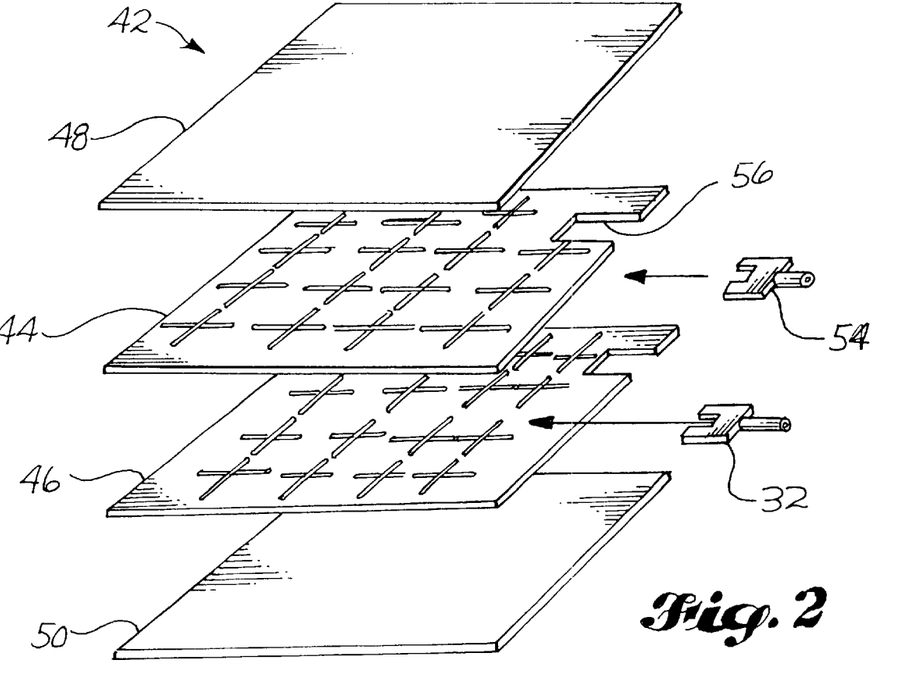
FIG. 2 is a schematic exploded diagram showing the four sheets which make up the sandwich structure shown in FIG. 1.

The weld pattern, shown schematically in FIGS. 2 and 4, is in the form of a series of orthogonally aligned crosses 94, or considered differently, is a grid pattern with interruptions or gaps 96 in the weld lines midway between each intersection 98 in the weld lines. The gaps 96 in the weld lines 92 provide a passage through which forming gas can flow when the core pack 45 is superplastically formed by heating to about 1760° F. in a die and injecting forming gas through the core gas fitting 52, as illustrated schematically in FIG. 5. When the core pack 45 is inflated, the gaps 96 open to provide near circular openings 100 in webs 102 formed by the material of the top and bottom core sheets 44 and 46 as the material stretches superplastically away from the laser welds 92.

After the grid pattern is laser welded into the sheets 44 and 46, the sheets 44 and 46 are seal welded completely around their periphery and around the core gas fitting 52 to fully seal the periphery of the core pack 45. A convenient type of welding for this purpose is gas tungsten arc welding (also referred to as TIG welding) wherein the welding arc can be directed into the edge face of the sheets 44 and 46. A conventional stainless steel compression coupling such as a Swagelock coupling (not shown) is attached to the gas fitting 52, and one end of a short length of stainless steel gas tubing is attached to the compression coupling. The other end of the tube is pinched shut and welded closed to seal off the interior of the core pack 45 against intrusion of cleaning solution for the following cleaning operation. The The sealed core pack 45 is cleaned by immersion in the alkaline bath and the pickling bath as describe above and is wiped with a fabric wad wetted with punctilious alcohol, as also described above. The cleaned core pack 45 is assembled between the cleaned face sheets 48 and 50, with the envelop gas fitting 54 positioned in the notch 56, and the periphery of the two face sheets 48 and 50 plus the core pack 45 is seal welded all around and around the envelop gas fitting 54 to produce a full pack 110 which is completely sealed, except for the gas flow path provided into the envelop pack 49 between the face sheets 48 and 50 through the envelop gas fitting 54 and the notch 56.

The envelop gas fitting 54 is sealed with another pinched and welded tube in a compression coupling, as described above for the core pack 45, and the full pack is cleaned as before. After cleaning, the full pack is now ready for superplastic forming and diffusion bonding to produce the expanded metal sandwich structure of this invention. The process is schematically illustrated in FIGS. 10 and 11A–E and described below.

The external surface of the pack 110 are coated with a parting agent, such as the boron nitride stop-off described above. Compression fittings are attached to the gas fittings 52 and 54 and gas lines from a forming gas control system, such as that described in U.S. Pat. No. 5,419,170 to Sanders et al. are connected to the compression couplings. The full pack is purged with inert gas, such as argon, to remove air and moisture from inside the envelop pack 49 and the core pack. This may be accomplished with several cycles of alternate vacuum suction and backfilling with argon under a pressure of about 0.5 PSI in the envelop pack 49 and about 10 PSI in the core pack 45, until the interior of the packs 45 and 49 are purged clean of air and moisture. The packs 45 and 49 are now pressurized with argon to separate the surfaces from each other. The pressure inside the core pack 45 is preferably higher than the pressure in the envelop pack 49 because the grid welds 92 tend to hold the core sheets 44 and 46 together more tightly than the peripheral weld holds the face sheets 48 and 50 together. The initial pressure is about 0.1 PSI in the skin zone within the envelop pack and about 10 PSI in the core pack 45. This provide sufficient pressure to prevent contact and premature diffusion bonding between the facing surfaces of the sheets, but not so high as to cause premature pillowing of the core envelop or tearing of the sheets at the laser welds or the peripheral welds. The pressurized pack 110 is placed in a die 112 preheated to about 1760° F., and the die is closed with a superplastic forming press (not shown). The die may be provided with grooves extending from an internal cavity to the exterior in which the gas fittings 52 and 54 lie to avoid squeezing shut the gas passages through the flange 58. After closing the die, the pressure of the forming gas in the envelop pack 49 is immediately increased to ensure expansion of the face sheets 48 and 50 away from the core pack 45, and the pressure in the core pack 45 is also increased to resist the compression of the gas pressure in the envelop pack 49.

Figure 11A:
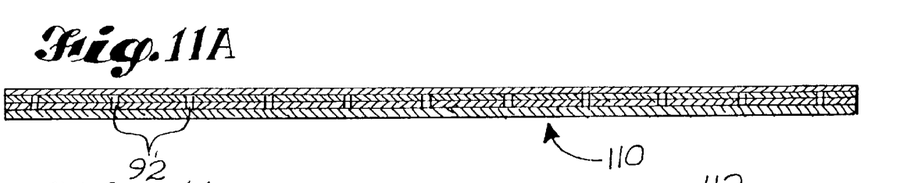
FIGS. 11A–11E are schematic diagrams showing the superplastic forming of the welded pack to produce the sandwich structure shown in FIG. 1.
Figure 11B:
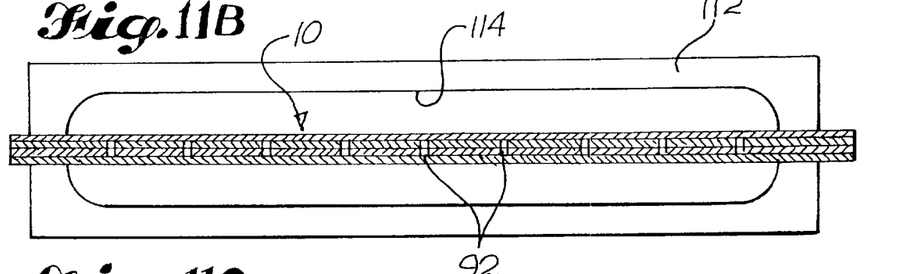
Figure 11C:
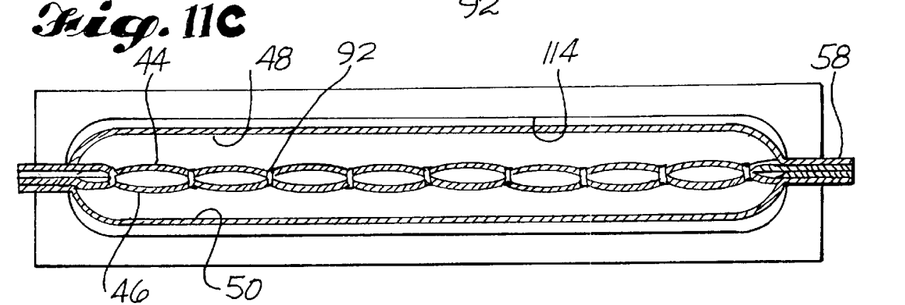
Figure 11D:
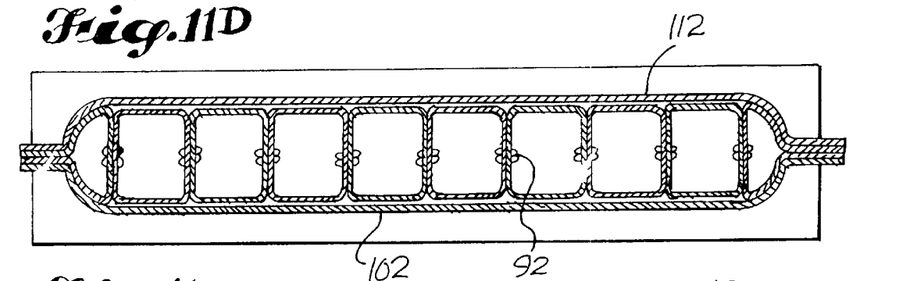
Figure 11E:
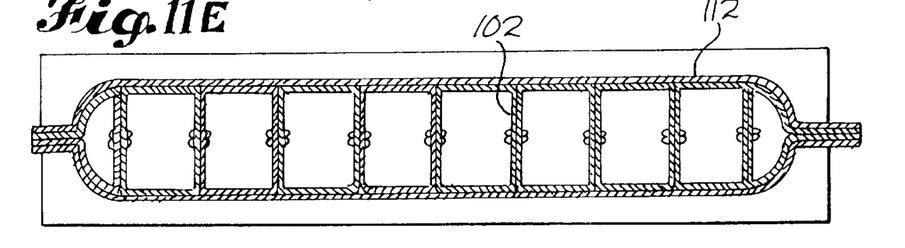
Figure 12A:
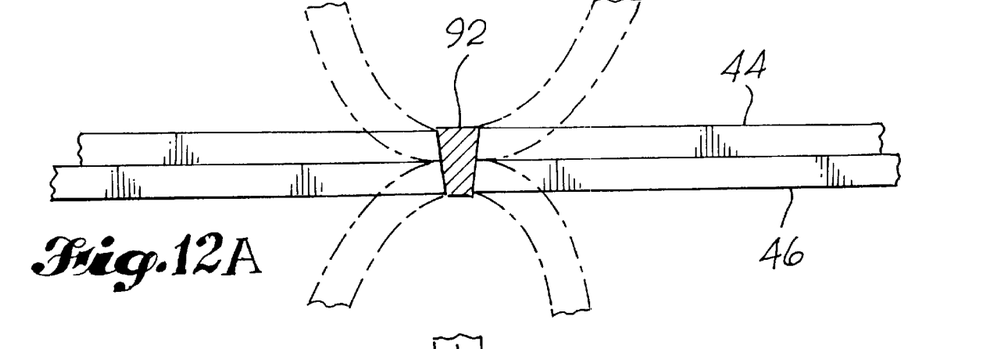
FIGS. 12A–12C are schematic sketches showing the formation of webs around the laser welds in the sandwich structure shown in FIG. 1.
Figures 12B, 12C:
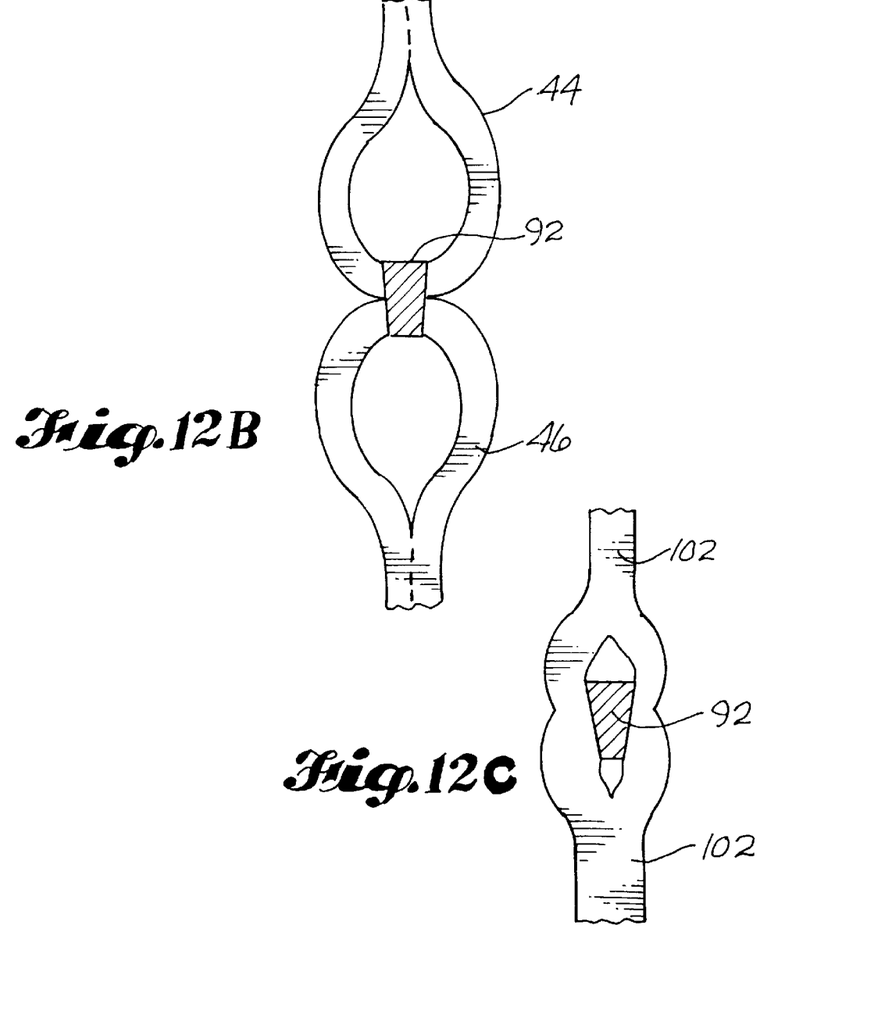
Figure 13:
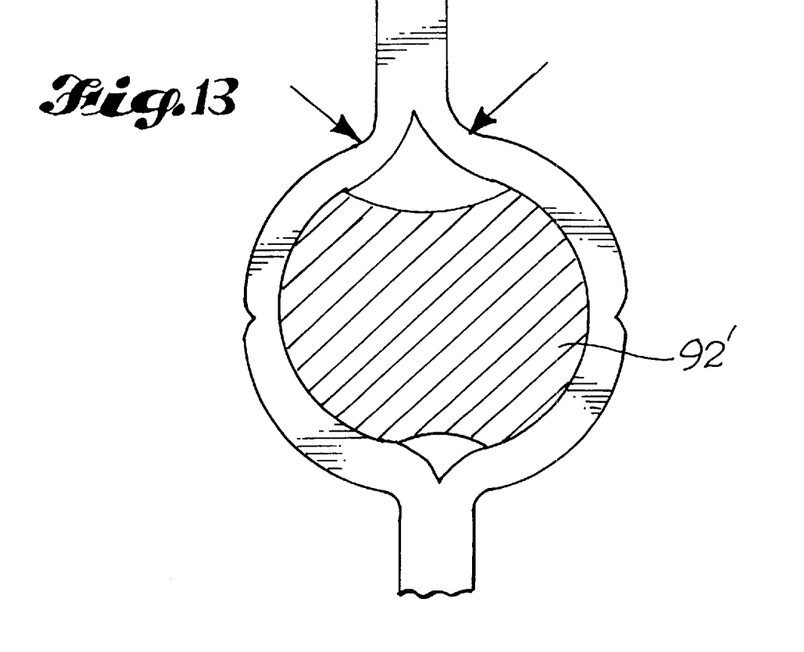
FIGS. 13 and 14 are comparison views of resistance roller welded weldments and laser welded weidments.
Figure 14:
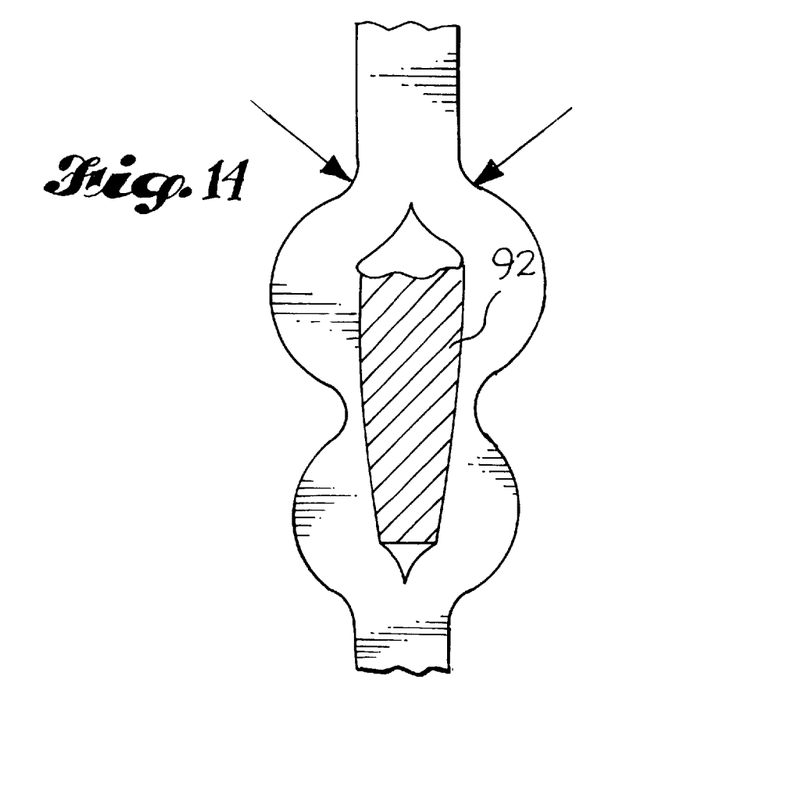
Figure 15:
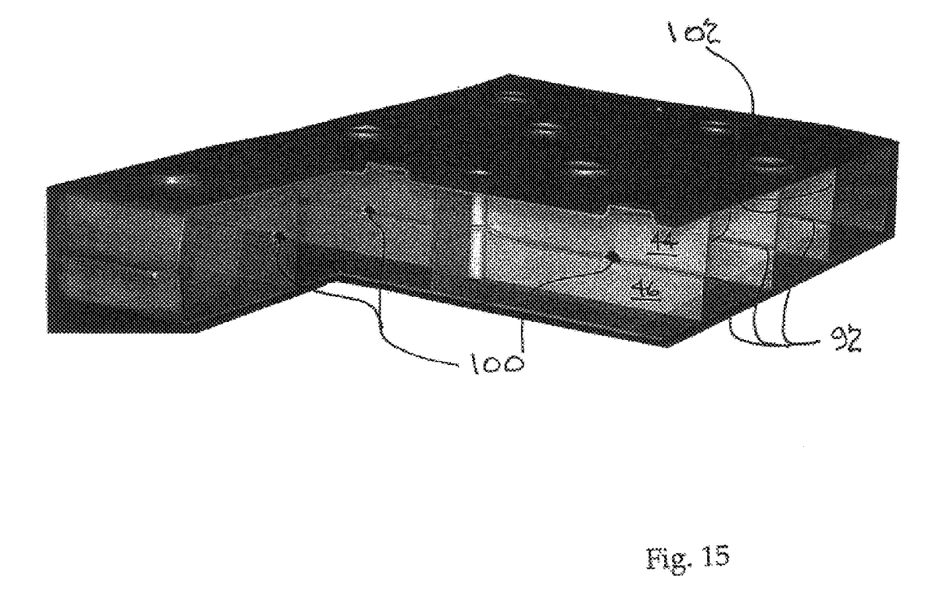
FIG. 15 is a photograph of a multisheet structure having a throughhole.

After the pack reaches forming temperature inside the die 112, the pressure in the envelope pack 49 and the core pack 45 is increased to forming pressure, and the sheets 44, 46, 48 and 50 superplastically stretch as shown in FIGS. 11C and 11D, and diffusion bond as shown in FIGS. 11D and 11E. The superplastic forming of the core sheets 44 and 46 around the laser welds 92 is shown in FIGS. 12A–C and in FIG. 8. The narrow width of the laser weldment 92 provides a small region around which the sheets 44 and 46 must wrap when they fold back over the weldment 92 to diffusion bond together to form the web 102. This is contrasted with a relatively wide weldment 92' shown in FIG. 13 that is made with a conventional resistance welding wheel. In the web 102' shown in FIG. 13, the thinning in the region above and below the weldment 92' can be seen to be considerably greater than it is for the laser weldment 92 shown in FIG. 14.

After the pack 110 is fully formed, as shown in FIG. 11E, the pressure is reduced to near ambient, about 0.05 PSI and the press is opened to open the die 112. The sandwich part is removed from the die cavity 114 and is allowed to cool while the gas pressure is maintained slightly above ambient to prevent the cooling part from pulling a vacuum and collapsing under air pressure. After cooling below 900° F., and preferably under 500° F., the gas lines are removed from the compression couplings, and the part is sealed with pinched and welded gas lines in the couplings for recleaning any external alpha case that may have formed on the part from high temperature contact of the external surfaces with air. After cleaning, the part may be trimmed to remove the gas fittings 52 and 54, and the part is completed.

Figure 3A:
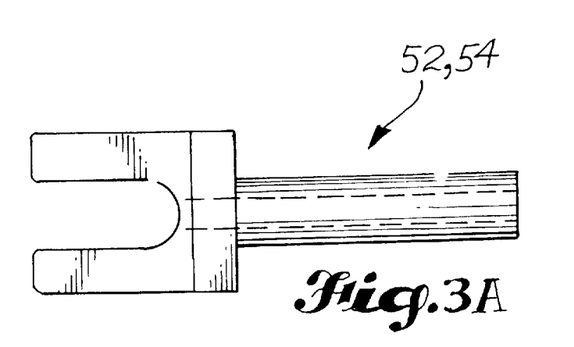
FIGS. 3A–C are orthogonal views of a gas fitting used in this invention.
Figure 3B:
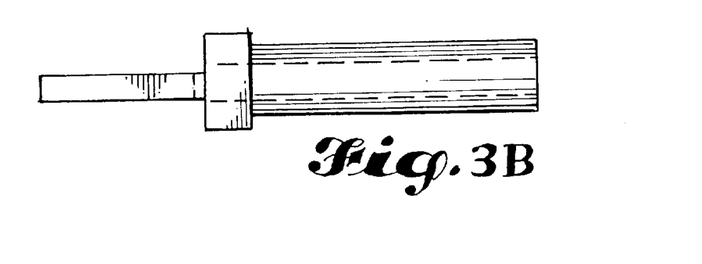
Figure 3C:
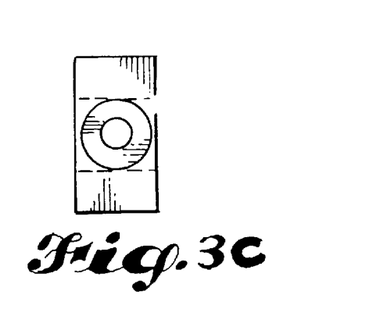

If it is desired to have sealed through openings in the part, the full pack 110 may be laser welded in a circle around the region where the opening is to be located. The interior of that region may be cut out with a laser cutter, which uses the same laser and table 60, but uses a high pressure gas nozzle instead of the gas flood nozzle shown in FIG. 3. The full pack is placed on a protective mat to prevent cutting or splattering of the surface of the table 60 when the laser cuts through the pack when cutting out the hole in the center of the seal weld region. A sleeve having the same height as the sandwich structure part is inserted in the opening cut out by the laser, and the full pack 110 with the sleeves installed in the openings is placed in the die cavity 114 and is superplastically formed around the sleeves. If the sleeve is a non-superplastic material such as stainless steel, it may be removed or retained, whichever is desired for the application. If a superplastic material such as titanium is use, it will diffusion bond in place in the opening and form the interior of the opening. The sleeve may be provided with a threaded insert for threaded connection to the part later, or the "sleeve" may be a solid titanium slug that can be drilled and tapped after the part has been formed for a connection hardpoint to the sandwich structure.

Accordingly, the method of making a sealed opening in a multisheet expanded metal sandwich structure includes the steps of:

assembling multiple sheets in a vertical stack;
    clamping the sheets together at a drill point and welding the sheets together around the periphery of a region in which a hole is to be drilled;

drilling a hole through the sheets in the region within the welded periphery;

inserting a sleeve into the hole, the sleeve being as long as the design thickness of the sandwich structure at the drill point;

inserting the sheets with the sleeve in a die having an internal cavity with a shape the same as the design shape of the sandwich structure; and superplastically expanding the sheets in the die cavity.

Obviously, numerous modifications and variations of the preferred embodiment described above will occur to those skilled in the art in light of this disclosure.

Accordingly it is expressly to be understood that these modification and variation, and the equivalents thereof, are to be considered to be within the spirit and scope of our invention, wherein we claim:

1. A method of making a sealed opening through a multisheet expanded metal sandwich structure, comprising:

assembling multiple sheets of an alloy suitable for superplastic forming in a vertical stack;

clamping the sheets together at a drill point and welding the sheets together around the periphery of a region in which a hole is to be drilled sequentially through the stack of sheets;

drilling a hole sequentially through the sheets in the region within the welded periphery so that the weld bounds the hole;

inserting a sleeve into the hole adjacent the weld, the sleeve having the same height as the sandwich structure at the drill point after the sheets are expanded;

inserting the sheets with the sleeve into a die having an internal cavity, the cavity having a shape the same as the intended design shape of the expanded sandwich structure; and superplastically expanding the sheets in the die cavity to form the expanded sandwich structure and to cause the welded and drilled sheets to contact said sleeve along the length of the sleeve to define a reinforced hole, being a sealed opening, through the expanded sandwich structure.

\* \* \* \* \*